United States Patent
Murakami et al.

(10) Patent No.: US 8,788,088 B2
(45) Date of Patent: Jul. 22, 2014

(54) PRODUCTION SYSTEM, PROCESSED OBJECT MANUFACTURING METHOD, AND CONTAINER TRANSFERRING METHOD

(75) Inventors: Yoshinobu Murakami, Kitakyshu (JP); Kengo Okadome, Fukuoka (JP); Toshihiko Fukushima, Omuta (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 157 days.

(21) Appl. No.: 13/402,878

(22) Filed: Feb. 23, 2012

(65) Prior Publication Data
US 2012/0239185 A1 Sep. 20, 2012

(30) Foreign Application Priority Data
Mar. 18, 2011 (JP) ................................. 2011-060126

(51) Int. Cl.
*G06F 7/00* (2006.01)
(52) U.S. Cl.
USPC ........... 700/218; 700/213; 700/214; 700/217; 700/219; 700/220; 700/230
(58) Field of Classification Search
None
See application file for complete search history.

(56) References Cited

U.S. PATENT DOCUMENTS

2009/0312865 A1* 12/2009 Bonnain et al. ............... 700/230

FOREIGN PATENT DOCUMENTS

| JP | 2008-272886 | 11/2008 |
| JP | 2008272886 A * | 11/2008 |

* cited by examiner

*Primary Examiner* — Yolanda Cumbess
(74) *Attorney, Agent, or Firm* — Mori & Ward, LLP

(57) ABSTRACT

The production system includes: an item feeding device having transfer mechanisms provided alongside and respectively transferring containers each storing an item to item feeding positions; a carrier device holding and carrying the container and the item at the feeding position; and a control device making: the item feeding device operate to select only one of the transfer mechanisms and to transfer the container of the selected transfer mechanism to the feeding position; the carrier device operate to hold the item from the container transferred to the feeding position and to carry the item to a transfer position; and the carrier device operate to hold the container transferred to the feeding position and to carry the container from the feeding position to a transfer position over an item feeding position for a different one of the transfer mechanisms.

20 Claims, 18 Drawing Sheets

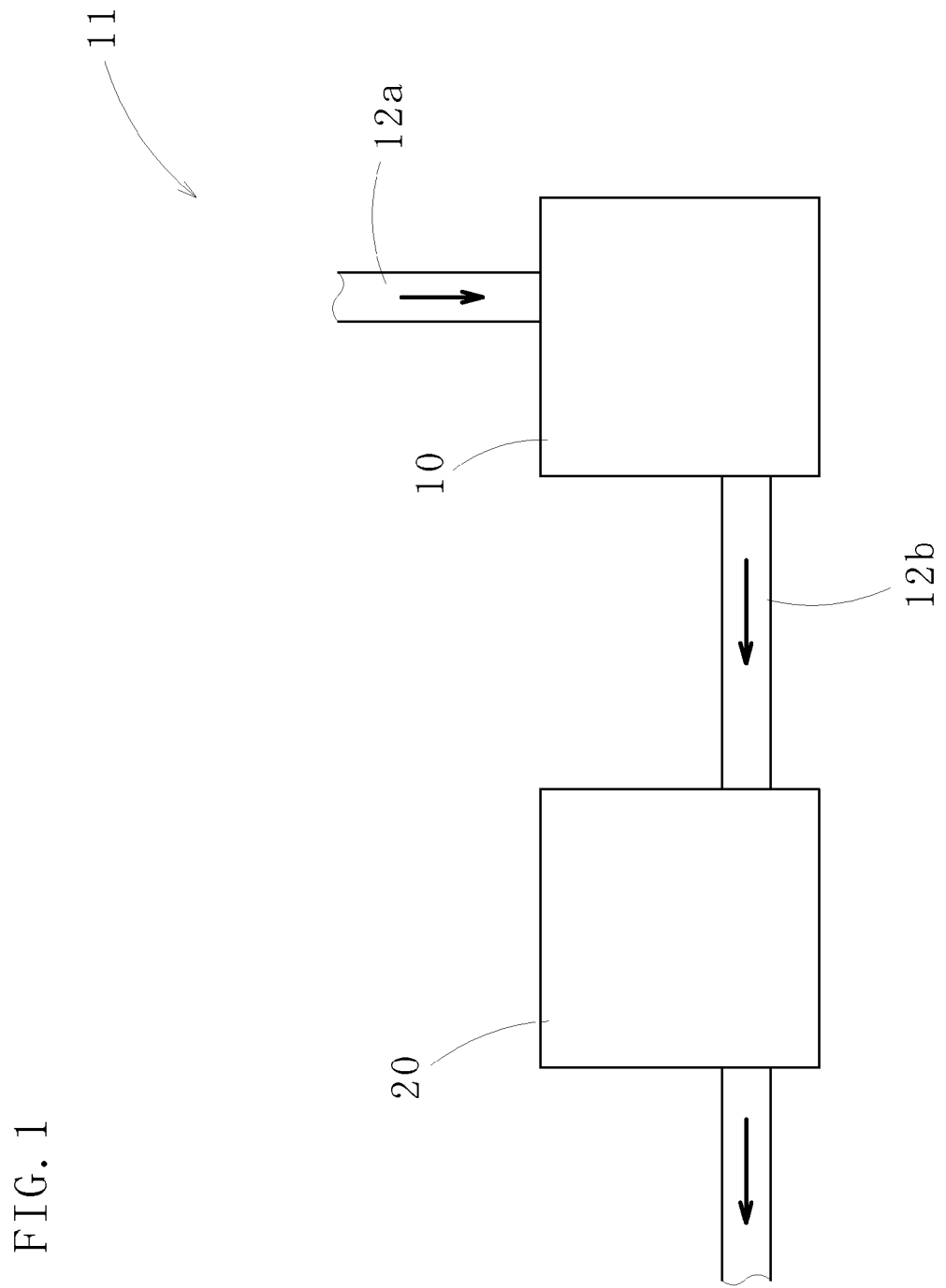

US 8,788,088 B2

PRODUCTION SYSTEM, PROCESSED OBJECT MANUFACTURING METHOD, AND CONTAINER TRANSFERRING METHOD

CROSS-REFERENCE TO RELATED APPLICATIONS

This application claims priority from Japanese Patent Application No. 2011-060126, filed with the Japan Patent Office on Mar. 18, 2011, the entire content of which is hereby incorporated by reference.

BACKGROUND

1. Technical Field

The disclosure relates to a production system, a processed object manufacturing method, and a container transferring method.

2. Description of Related Art

Japanese Unexamined Patent Publication No. 2008-272886 discloses a picking robot capable of picking workpieces out from a plurality of container boxes in which the workpieces are contained. The container boxes are transferred through a plurality of transfer lines provided along the same direction each to an end of the corresponding transfer line (short of the picking robot).

SUMMARY OF THE INVENTION

A production system according to a first aspect of the disclosure includes: an item feeding device having a plurality of transfer mechanisms provided alongside, the transfer mechanisms respectively transferring containers each storing an item to item feeding positions; a carrier device configured to hold and carry the container at the item feeding position and the item stored in the container; and a control device configured to control operations of the item feeding device and the carrier device. The control device has a function of causing the item feeding device to select only one of the plurality of transfer mechanisms and to transfer the container of the selected transfer mechanism to the item feeding position. The control device further has a function of causing the carrier device to hold the item in the container transferred to the item feeding position and to carry the held item to a preliminary determined transfer position P1. The control device further has a function of causing the carrier device to hold the container transferred to the item feeding position, and to carry the container from the item feeding position to a preliminary determined transfer position P2 over an item feeding position for a different one of the transfer mechanisms.

BRIEF DESCRIPTION OF DRAWINGS

FIG. 1 is a configuration diagram of production equipment having a production system according to one embodiment;

DESCRIPTION OF THE EMBODIMENTS

In each of the drawings, some of components that do not relate to the description may not be illustrated.

Referring to FIG. 1, a production system 10 according to one embodiment is applied to production equipment 11 for producing (manufacturing) motor control apparatuses (examples of processed object) such as servo amplifiers and inverters, for example.

Figure 2A:
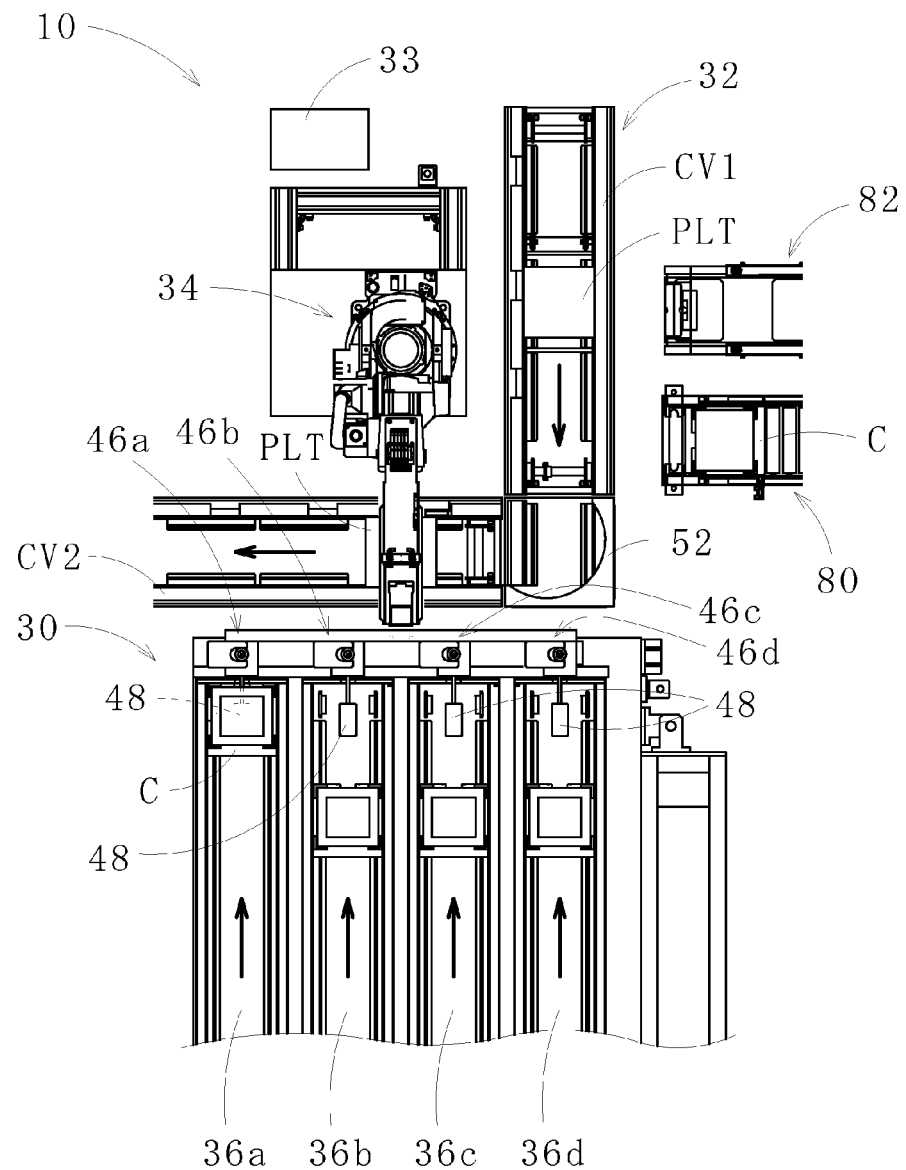
FIG. 2A is a plan view of the production system.

The production system 10 can, for example, place a component on a carrying pallet PLT that has been transferred by a transfer conveyor 12a from an upstream side (see FIG. 2A). The production system 10 also can, for example, mount another component on a component that has been transferred by the transfer conveyor 12a from the upstream side. The component transferred from the production system 10 is then transferred to a downstream side by a transfer conveyor 12b, and is processed (cut or assembled), for example, by another production system 20 for post processing.

Figure 2B:
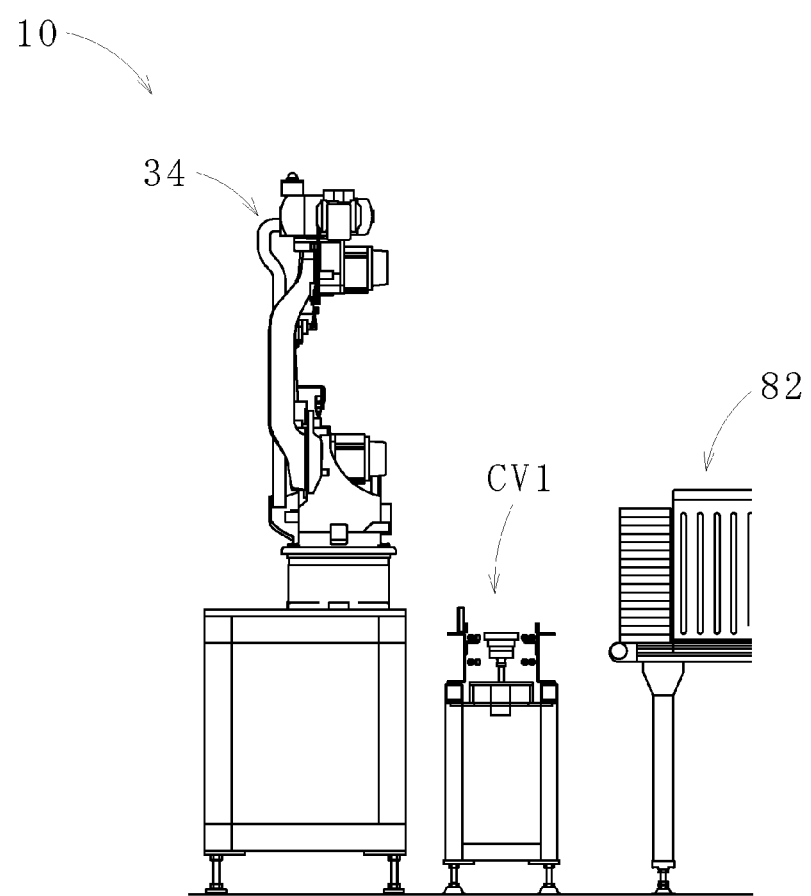
FIG. 2B is a partially omitted front view of the production system.
Figure 2C:
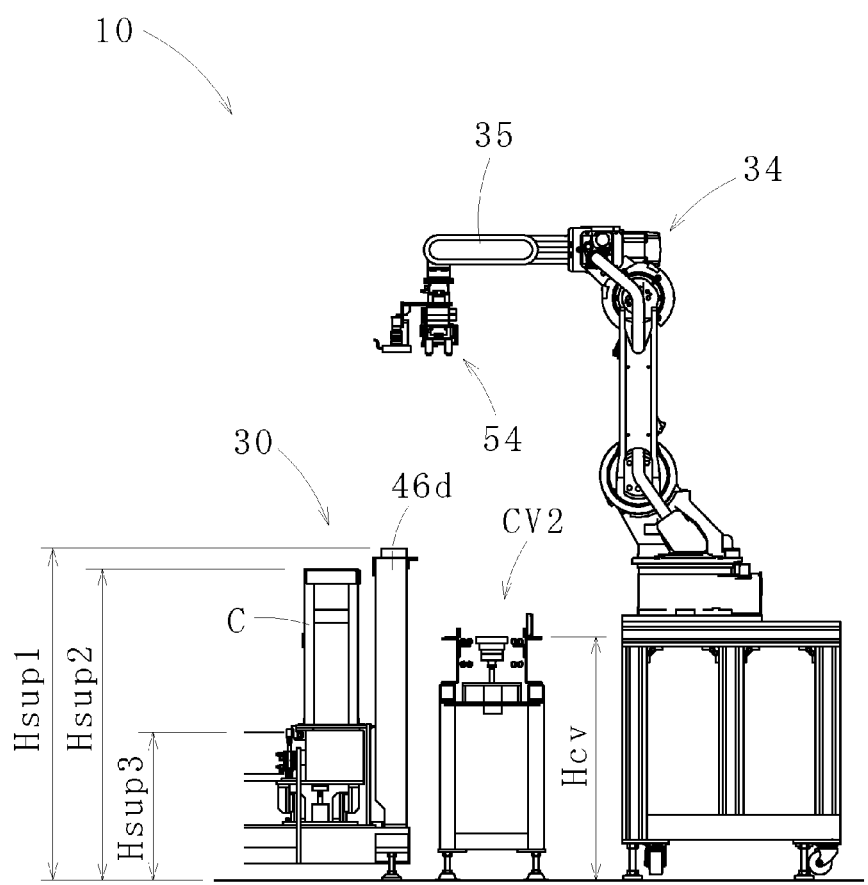
FIG. 2C is a partially omitted side view of the production system.

Referring to FIGS. 2A to 2C, the production system 10 includes a component feeding device (one example of an item feeding device) 30, a transfer conveyor 32, an industrial robot (one example of a carrier device, hereinafter simply referred to as a "robot") 34, and a control device 33.

The component feeding device 30 includes a plurality of transfer mechanisms 36a to 36d that are arranged along a transfer direction, and a plurality of lifting mechanisms 46a to 46d.

Each of the plurality of transfer mechanisms 36a to 36d can transfer a container C.

Figure 3:
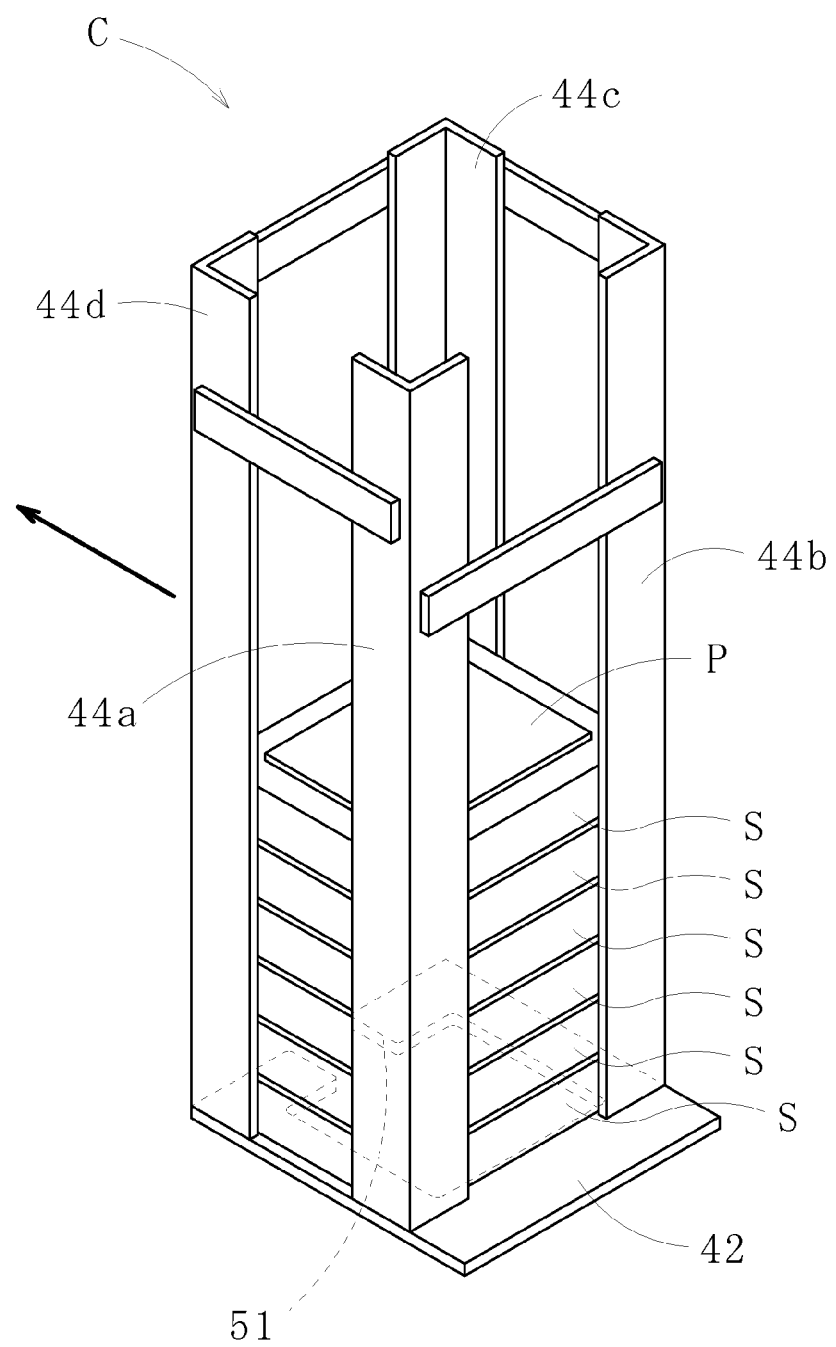
FIG. 3 is a perspective view of a container transferred by a component feeding device of the production system.

Referring to FIG. 3, the container C includes a plate-like base member 42 and four angle members (one example of a plurality of positioning members) 44a to 44d that extend upward from an upper surface of the base member 42.

Here, the container C stores a plurality of components (one example of items) P of a product, for example. The components P are, for example, heat sinks for motor control apparatuses. The components P are placed respectively on plate-like spacers S, stacked on top of each other and stored. The spacers S are positioned within a range that is pre-defined by the angle members 44a to 44d in directions excluding a vertical direction.

The plurality of containers C are respectively transferred by the transfer mechanisms 36a to 36d along a direction indicated by an arrow in FIG. 3.

Figure 4:
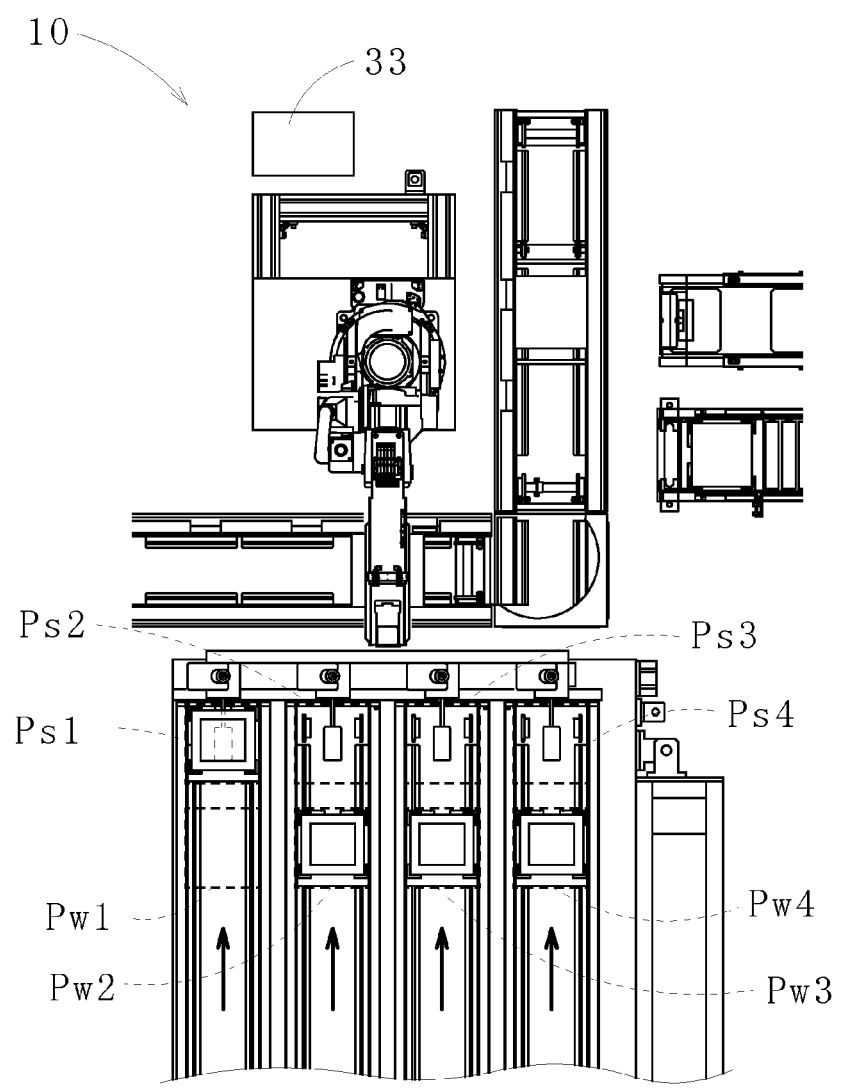
FIG. 4 is an illustrative view showing an item feeding position and a waiting position of the component feeding device of the production system.

The plurality of transfer mechanisms 36a to 36d shown in FIG. 2A are disposed at an interval between each other, and extend in one direction (first direction). As shown in FIG. 4, each of the transfer mechanisms 36a to 36d can move the container C either to the corresponding one of item feeding positions Ps1 to Ps4 at a downstream end in the transfer direction, or to the corresponding one of waiting positions Pw1 to Pw4 that is short of (on the upstream side in the transfer direction of) the item feeding positions Ps1 to Ps4.

Lifting mechanisms 46a to 46d shown in FIG. 2A are respectively provided further on the downstream side in the transfer direction from the item feeding positions Ps1 to Ps4 of the transfer mechanisms 36a to 36d. Each of the lifting mechanisms 46a to 46d includes a supporting member 48 that moves up and down.

Figure 5:
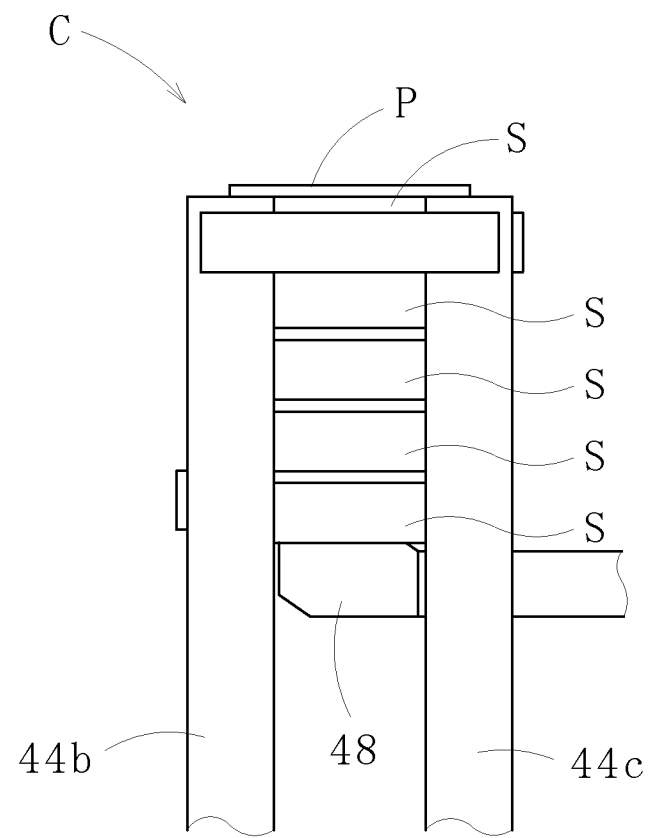
FIG. 5 is an illustrative view showing an operation of a lifting mechanism of the component feeding device of the production system.

Each supporting member 48 moves upward from a position under the base member 42 of the container C that has been transferred to the corresponding one of the item feeding positions Ps1 to Ps4 through a cut-out 51 provided in the base member 42 (see FIG. 3), and is brought into contact with a lower surface of a lowermost one of the spacers S in the container C. As the supporting member 48 further moves upward, as shown in FIG. 5, the supporting member 48 supports the lower surface of the lowermost one of the spacers S in the container C. Therefore, when the supporting member 48 moves upward, the plurality of components P stacked on top of each other also move upward. Consequently, as shown in FIG. 5, an uppermost one of the components P stacked on top of each other is supplied at a preliminary determined item feeding height (preliminary determined height).

The transfer conveyor 32 includes a first conveyer section CV1, a second conveyer section CV2, and a diverting device 52.

The first conveyer section CV1 is connected to an downstream end of the transfer conveyor 12a shown in FIG. 1, and extends substantially along the same direction as the transfer direction of the transfer mechanisms 36a to 36d of the component feeding device 30. As shown in FIG. 2A, the first conveyer section CV1 transfers the carrying pallet PLT.

The second conveyer section CV2 extends along a direction in which the lifting mechanisms 46a to 46d of the component feeding device 30 are aligned, and its downstream end is connected to the transfer conveyor 12b shown in FIG. 1. Specifically, the second conveyer section CV2 extends along a direction that intersects with the transfer direction of the transfer mechanisms 36a to 36d of the component feeding device 30.

The diverting device 52 is disposed adjacent to a downstream end of the first conveyer section CV1 and an upstream end of the second conveyer section CV2. The diverting device 52 can receive the carrying pallet PLT transferred by the first conveyer section CV1, and to transfer the received carrying pallet PLT to the second conveyer section CV2.

The robot 34 is, for example, a vertical articulated robot having six articulated shafts. The robot 34 is disposed across the second conveyer section CV2 from the component feeding device 30, and next to the first conveyer section CV1 and the second conveyer section CV2.

Figure 6A:
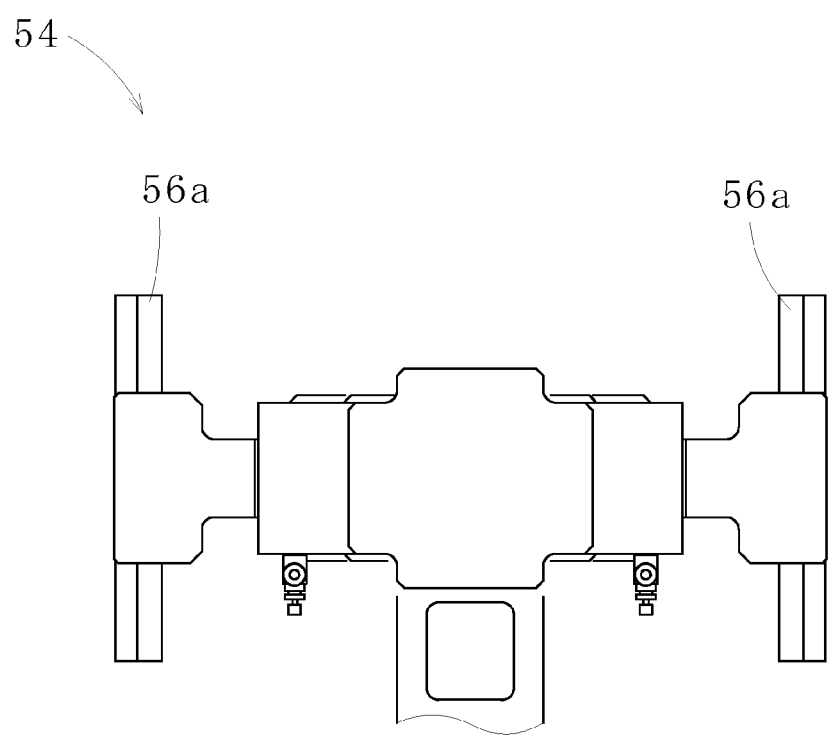
FIG. 6A is a plan view of a hand of a robot of the production system.
Figure 6B:
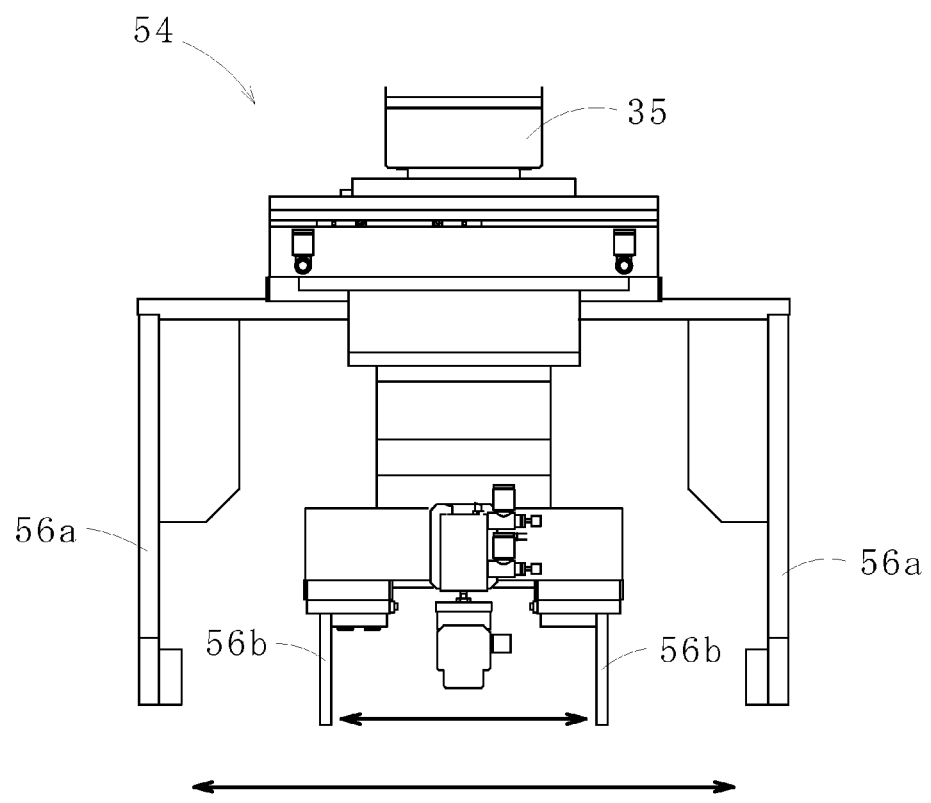
FIG. 6B is a front view of the hand of the robot of the production system.
Figure 6C:
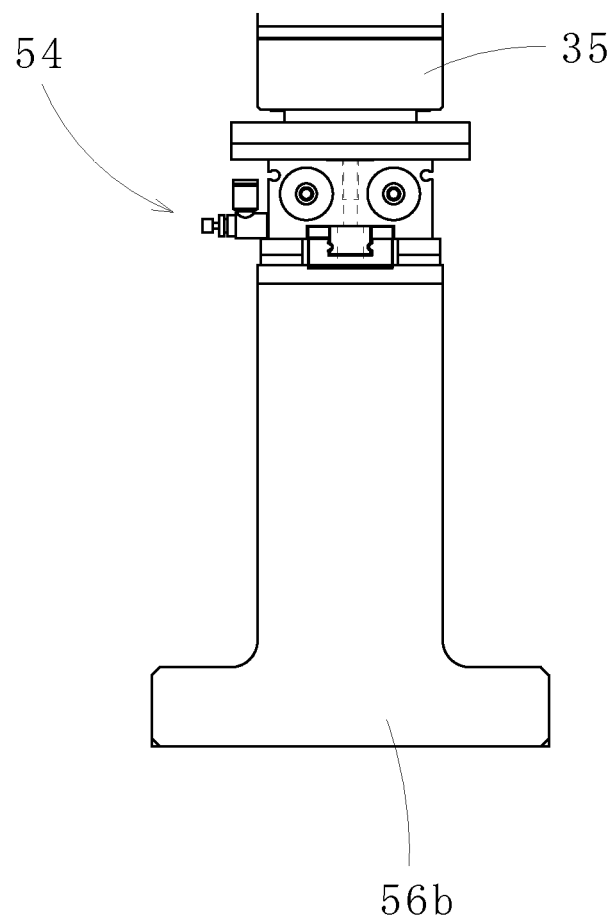
FIG. 6C is a side view of the hand of the robot of the production system.

At a tip end of an arm 35 of the robot 34, a hand 54 shown in FIGS. 6A to 6C is provided (see FIG. 2C).

Referring FIG. 6B, the hand 54 includes a first gripping claw 56a and a second gripping claw 56b both of which operate to open and close.

The first gripping claw 56a can hold a top end portion of the container C.

Figure 7A:
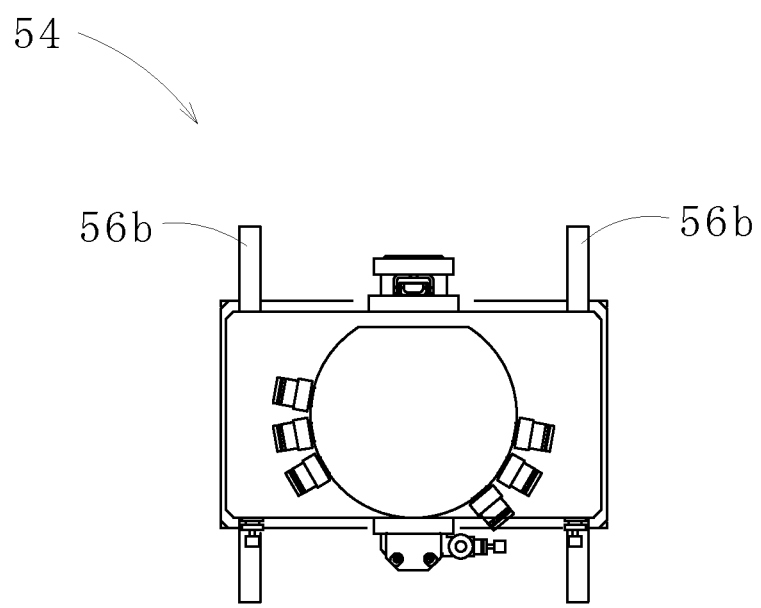
FIG. 7A is a plan view of a second gripping claw provided for the hand of the robot of the production system.
Figure 7B:
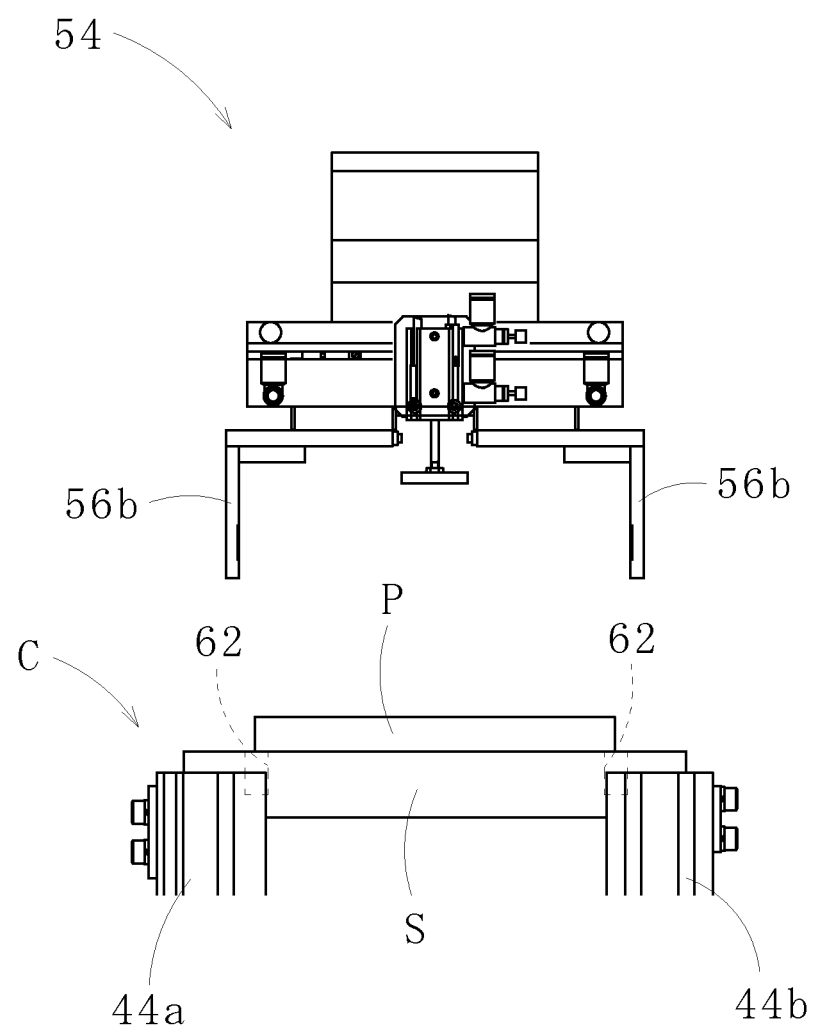
FIG. 7B is a front view of the second gripping claw provided for the hand of the robot of the production system.
Figure 7C:
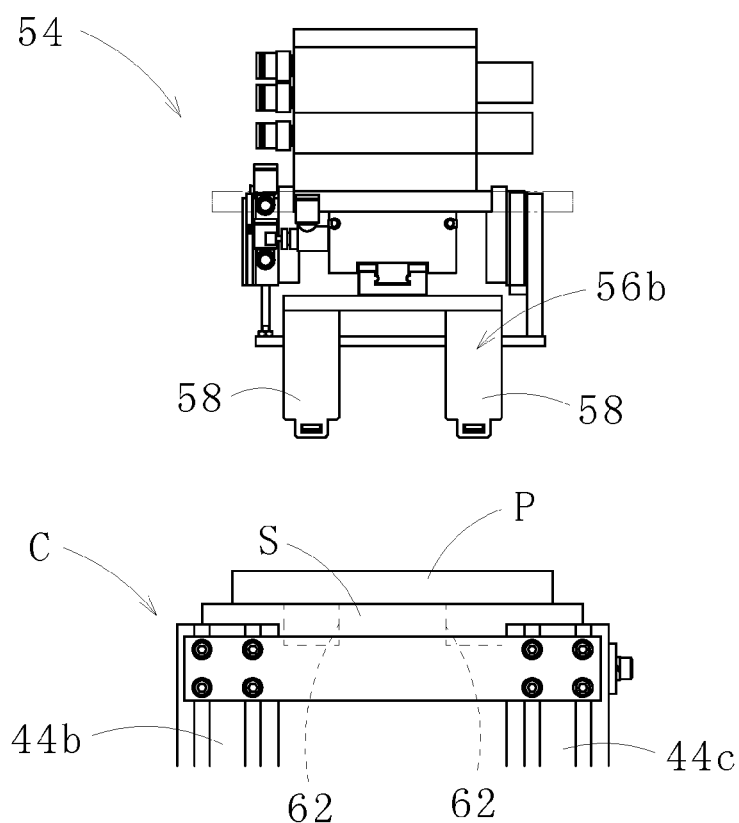
FIG. 7C is a side view of the second gripping claw provided for the hand of the robot of the production system.

As shown in FIGS. 7A to 7C, the second gripping claw 56b can hold the component P and the spacer S at the preliminary determined item feeding height from the container C at the corresponding one of the item feeding positions Ps1 to Ps4. As shown in FIG. 6B, the second gripping claw 56b is provided within the first gripping claw 56a. The second gripping claw 56b is smaller than the first gripping claw 56a. As shown in FIG. 7C, the second gripping claw 56b is provided with two claw sections 58 on either side (four claw sections in total).

The second gripping claw 56b can hold the component P by the claw sections 58 being brought into contact with an end surface of the component P placed on the spacer S. Further, the second gripping claw 56b can hold the spacer S by the claw sections 58 being respectively inserted into four grooves 62 provided in an upper surface of the spacer S and being brought into contact with inner side surfaces of the grooves 62 (see FIGS. 7B and 7C).

Specifically, the first gripping claw 56a can hold the container C. By contrast, the second gripping claw 56b provided within the first gripping claw 56a and smaller than the first gripping claw 56a can hold the component P stored in the container C.

The hand 54 further includes a first air cylinder 64a and a second air cylinder 64b (one example of a first fluid cylinder and a second fluid cylinder, respectively) that respectively drive the first gripping claw 56a and the second gripping claw 56b.

The first air cylinder 64a and the second air cylinder 64b are configured as a double-acting cylinder, for example.

Figure 8:
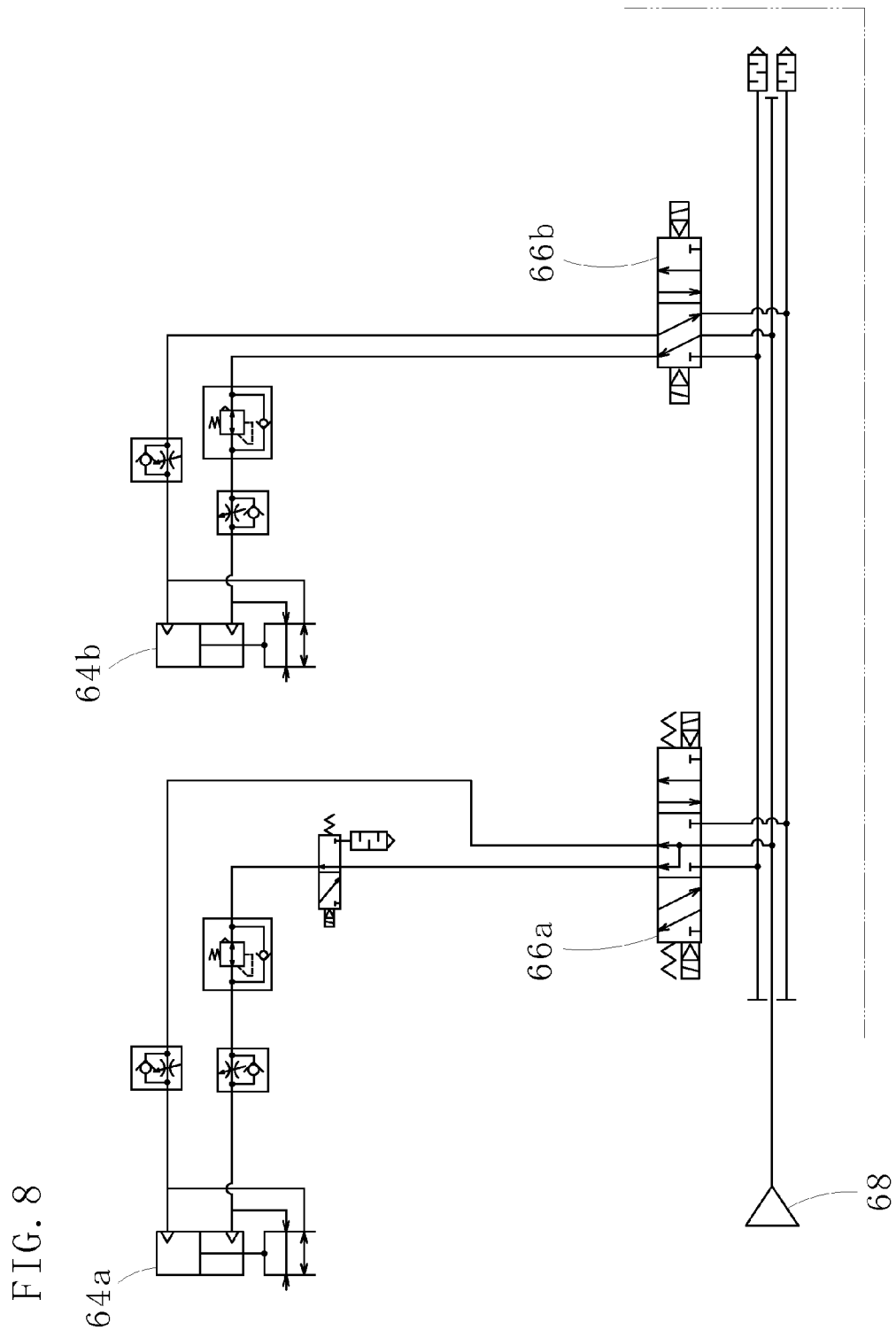
FIG. 8 is an operational circuit diagram of a first and a second air cylinder provided for the hand of the robot of the production system.

As shown in FIG. 8, an operating circuit of the first air cylinder 64a and the second air cylinder 64b includes a first solenoid valve 66a and a second solenoid valve 66b respectively controlling operations of the first air cylinder 64a and the second air cylinder 64b. As shown in FIG. 8, the first air cylinder 64a and the second air cylinder 64b are operated by air (one example of a fluid) supplied from a common (single) air pressure source 68 (one example of a fluid supply source).

Figure 9A:
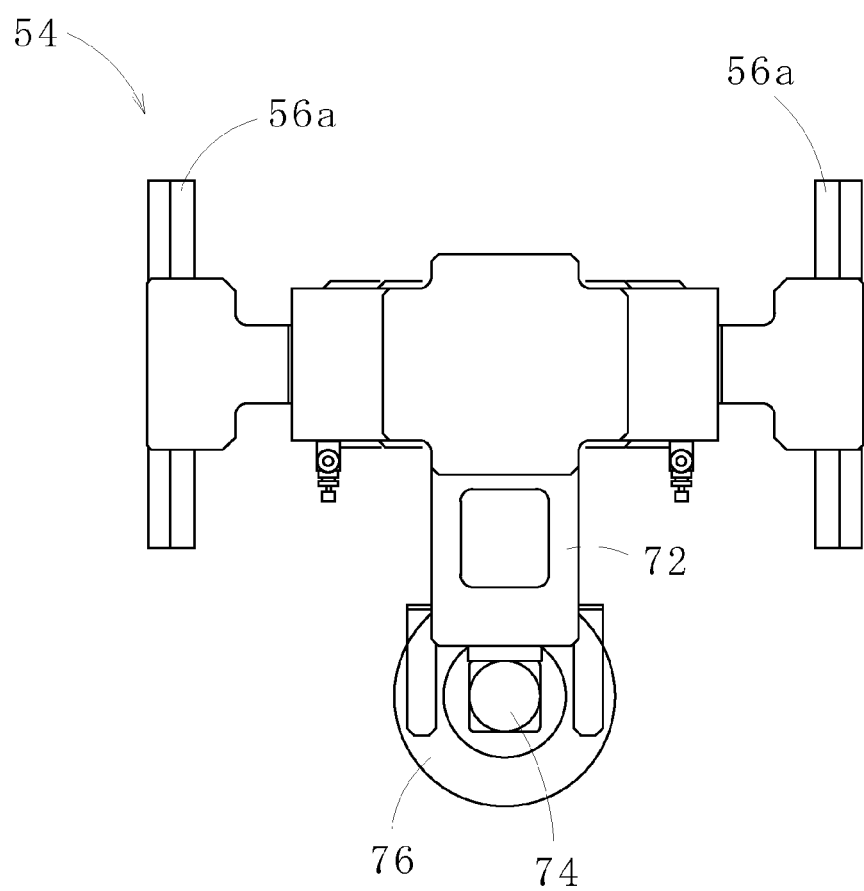
FIG. 9A is a plan view of a camera provided for an arm of the robot of the production system.
Figure 9B:
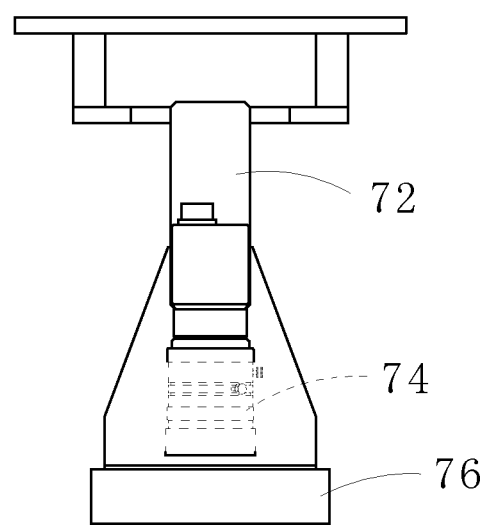
FIG. 9B is a front view of the camera provided for the arm of the robot of the production system.
Figure 9C:
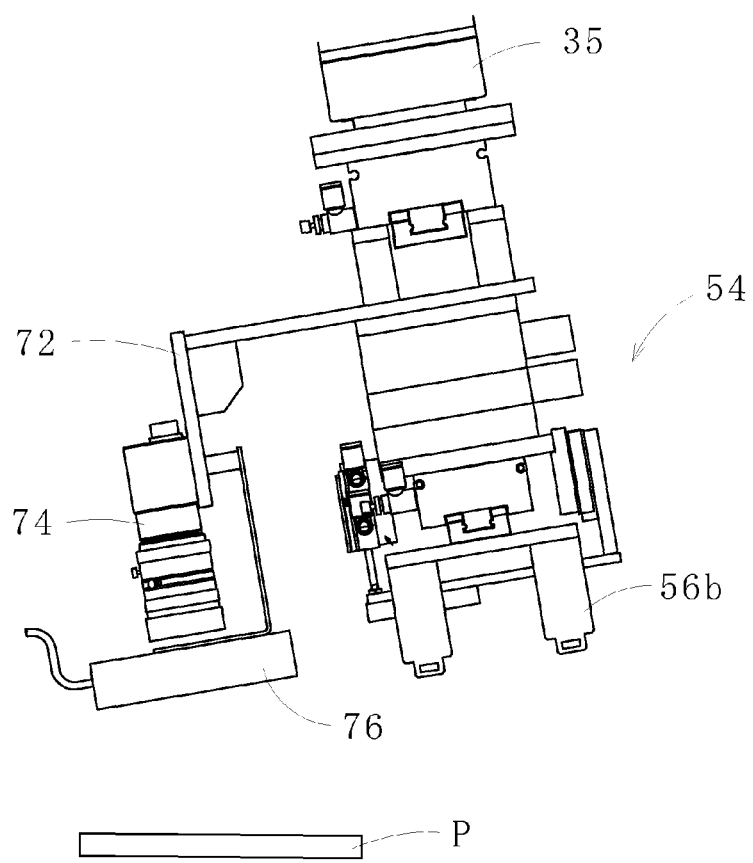
FIG. 9C is a side view of the camera provided for the arm of the robot of the production system.

On a side of the hand 54, as shown in FIGS. 9A to 9C, a camera 74 fixed to the arm 35 of the robot 34 via a bracket 72 is provided. On a tip end side of the camera 74, an illumination lamp 76 is provided. The camera 74 picks up an image of the component P that is stored in the container C and lifted up to the item feeding height by one of the lifting mechanisms 46a to 46d (see FIG. 9C). By processing the picked-up image, an amount of displacement of the component P from the preliminary determined position (positional displacement amount 6) is obtained.

The control device 33 shown in FIG. 2A can at least control operations of the component feeding device 30 and the robot 34. The control device 33 does not need to be configured as a single device, and may be configured by a plurality of devices.

A collecting conveyor 80 for collecting the container C after all the components P are taken out is disposed across the first conveyer section CV1 from the robot 34. The collecting conveyor 80 is, for example, a gravity conveyor having a transfer plane slanted from an upstream side to a downstream side, and transfers the component P by its own weight.

Further, a collecting conveyor 82 for collecting the spacers S transferred from the container C is disposed next to the collecting conveyor 80. the collecting conveyor 82 is, for example, a conveyor belt.

Next, heights of the component feeding device 30, the transfer conveyor 32, and the collecting conveyor 80 for collecting the container C will be described.

A maximum height Hsup1 of the component feeding device 30 corresponds to a height of the lifting mechanisms 46a to 46d (see FIG. 2C). The height Hsup1 is 1100 mm, for example.

A height Hsup2 of an upper end of the container C transferred by the corresponding one of the transfer mechanisms 36a to 36d is 1000 mm, for example.

A transfer height Hsup3 of the transfer mechanisms 36a to 36d of the component feeding device 30 is 500 mm, for example.

A transfer height Hcv of the transfer conveyor 32 (the first conveyer section CV1 and the second conveyer section CV2) is 810 mm, for example.

A maximum height Hcvc (not illustrated) of a transfer plane of the collecting conveyor 80 is 700 mm, for example.

Specifically, the heights of the component feeding device 30, the transfer conveyor 32, and the collecting conveyor 80 for collecting the container C satisfies an expression listed below, for example.

$$Hsup1 > Hsup2 > Hcv > Hcvc > Hsup3 \quad \text{Expression (1)}$$

Where Hsup1 is the maximum height of the component feeding device 30, Hsup2 is the height of the upper end of the container C transferred by the corresponding one of the transfer mechanisms 36a to 36d, Hcv is the height of the transfer plane of the transfer conveyor 32, Hcvc is the maximum height of the transfer plane of the collecting conveyor 80, and Hsup3 is the height of the transfer plane of the transfer mechanisms 36a to 36d.

Next, an operation of the production system will be described step by step. The operation described below is materialized as functions of the control device 33 by software applications executed by a CPU (not illustrated) provided for the control device 33.

In Step S1, the containers C in which the components P are stored are respectively placed on the upstream ends of the transfer mechanisms 36a to 36d of the component feeding device 30. A type of the components P stored in one of the containers C can be different from that in the other containers C. The types and quantities of the components P stored in the respective containers C are managed by a higher-level control device that is not illustrated.

In Step S2, the transfer mechanisms 36a to 36d transfer the respective containers C to the waiting positions Pw1 to Pw4 shown in FIG. 4 (one example of a first step).

In Step S3, the control device 33 selects only one of the plurality of transfer mechanisms 36a to 36d. The component feeding device 30 transfers the container C on the selected transfer mechanism from the waiting position to the item feeding position (one example of a second step). As shown in FIGS. 2A and 4, for example, only the container C that has been transferred by the transfer mechanism 36a is transferred to the item feeding position Ps1.

In Step S4, if there is no component P at the preliminary determined item feeding height in the container C transferred to the item feeding position, the component feeding device 30 moves the supporting member 48 of the corresponding lifting mechanism (the lifting mechanism 46a in FIG. 2A) upward, and moves one of the components P to the item feeding height.

In Step S5, the robot 34 picks up an image of the component P at the item feeding height using the camera 74 (see FIG. 9C). Using an image processor that is not illustrated, the shape of the component P is recognized, and a positional displacement amount δ of the component P is obtained. Further, the image processor performs an imaging test whether or not the type of the component P stored in the container C is the same as a type of the component managed by the higher-level control device. The imaging test prevents a component different from the managed component P from being transferred. The image processor can be built in within the control device.

In Step S6, a destination position of the robot 34 is corrected based on the positional displacement amount δ of the component P obtained in the previous step. The robot 34 is operated based on the corrected destination position, and as shown in FIG. 7B, holds the component P using the second gripping claw 56b of the hand 54. The robot 34 transfers the held component P, and places the held component P on the carrying pallet PLT stationed at a preliminary determined position (preliminary determined transfer position P1) along the second conveyer section CV2.

In Step S7, while the robot 34 transfers the component P in the previous step, the lifting mechanism (the lifting mechanism 46a in FIG. 2A) moves the spacer S up to the item feeding height.

In Step S8, the second conveyer section CV2 transfers the carrying pallet PLT on which the component P is placed to the downstream side. The carrying pallet PLT is passed onto the transfer conveyor 12b, and transferred to the production system 20 (see FIG. 1) for post processing.

In Step S9, the robot 34 holds the spacer S at the item feeding height using the second gripping claw 56b of the hand 54. The robot 34 transfers the held spacer S to a transfer position P3 along the collecting conveyor 82.

In Step S10, while the robot 34 transfers the spacer S, a subsequent one of the carrying pallets PLT is transferred to the second conveyer section CV2, and stationed at the preliminary determined position.

Thereafter, the production system 10 repeats steps S4 to S10 described above until all of the components P stored in the container C are transferred.

Once the robot 34 takes out all the components P stored in the container C, only the spacer S that is supported by the supporting member 48 of the lifting mechanism remains within the container C.

In Step S11, the supporting member 48 of the lifting mechanism moves downward, and the last spacer S moves to the bottom of the container C (the upper surface of the base member 42 shown in FIG. 3).

In Step S12, the robot 34 holds upper side portion of the container C using the first gripping claw 56a of the hand 54. The robot 34 lifts the held container C upward by 100 mm to 150 mm. Specifically, a height of a lower end of the lifted container C from the floor is from 600 mm to 650 mm, for example.

Figure 10:
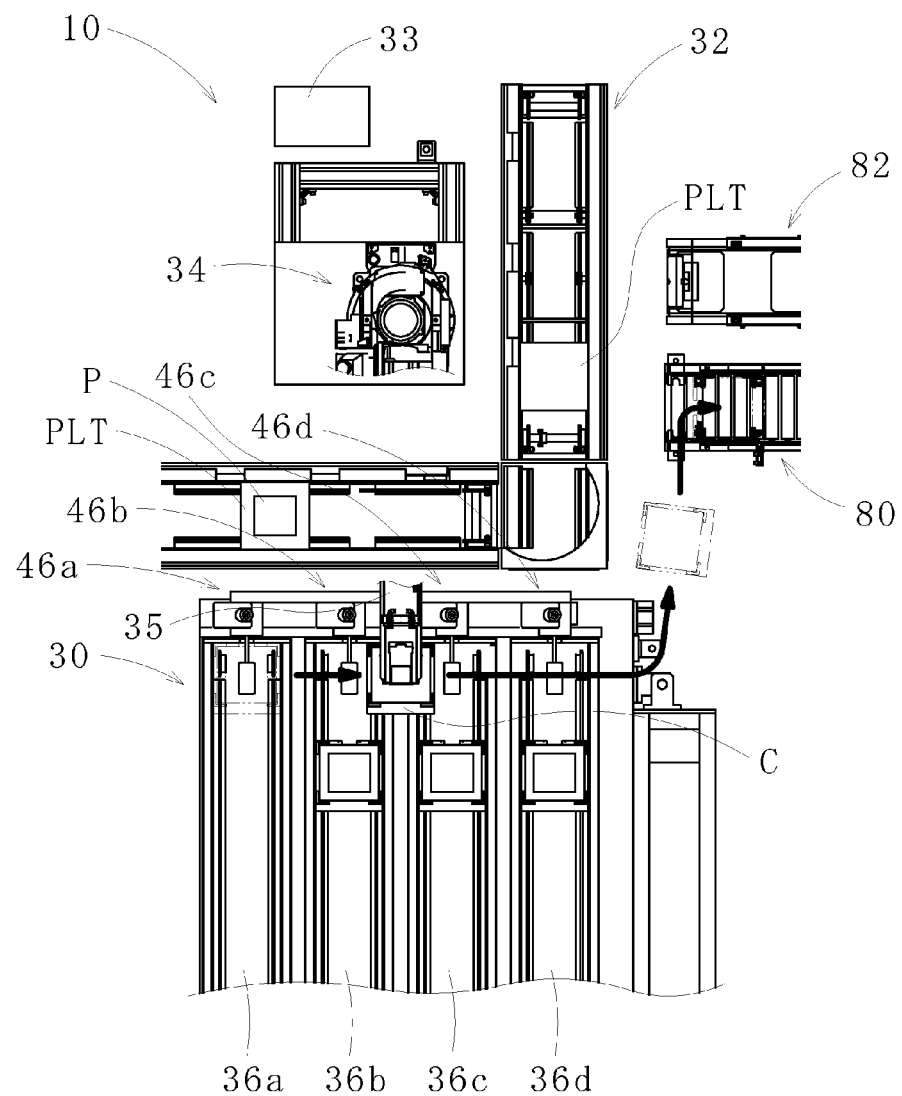
FIG. 10 is an illustrative view showing a path of the container transferred by the robot of the production system.

In Step S13, the robot 34 transfers the lifted container C across and over the transfer mechanism. To be more specific, the robot 34 moves the container C from the component feeding device 30 over the item feeding positions of the transfer mechanisms while maintaining the height of the lifted container C. Specifically, as shown in FIG. 10, the robot 34 moves the container C from the component feeding device 30 over the item feeding positions Ps2, Ps3, and Ps4 (following a path indicated by an arrow shown in FIG. 10), for example (one example of a third step). In this case, when passing over the item feeding positions of the transfer mechanisms, the lower end of the container C moves at a height lower than the upper end of the container C at the waiting position. However, it is preferable that the lower end of the container C moves at a height even lower than the transfer position P1.

As described above, the robot 34 can move the container C from the component feeding device 30 after moving the container C in a direction (second direction) intersecting with the transfer direction of the transfer mechanisms 36a to 36d (first direction), without lifting the container C high, in order to move the container C across the lifting mechanisms 46a to 46d, the first conveyer section CV1, and the second conveyer section CV2 that are positioned along the transfer direction of the transfer mechanisms 36a to 36d. The second direction can be substantially perpendicular to the first direction.

In this case, as the arm 35 oscillates if the robot 34 (see FIG. 2C) lifts the container C high, the transfer speed cannot be increased.

However, according to this embodiment, as the container C is at least not lifted higher than the upper end of the other containers C, it is possible to increase the transfer speed, thereby reducing tact time. Further, as compared to a case in which the container C is transferred while being lifted higher than the upper end of the other containers C, it is possible to employ a robot having a smaller transporting capability C, thereby downsizing the production system 10.

In Step S14, the robot 34 transfers the container C moved out from the component feeding device 30 to the collecting conveyor 80. As described above, the maximum height Hcvc of the transfer plane of the collecting conveyor 80 is 700 mm, for example, and the robot 34 transfers the container C by further lifting the container C taken out from the component feeding device 30.

The container C is placed on the collecting conveyor 80 at the preliminary determined transfer position P2. The container C moves downstream due to its own weight, and is collected by a worker. In the collected container C, the components P and the spacers S are newly stored, and again placed on the component feeding device 30.

As described above, one spacer S remains in the collected container C. Accordingly, the lowermost one of the components P in the container C can be stored in the container C only by being placed on the remaining spacer S. This improves working efficiency of the worker.

In Step S15, while the robot 34 transfers the container C to the collecting conveyor 80, a subsequent one of the carrying pallets PLT is transferred to the second conveyer section CV2, and stationed at the preliminary determined position. Further, the transfer mechanism of the component feeding device 30 transfers the container C storing the components P to be newly transferred to the item feeding position.

Thereafter, the production system 10 repeats steps S1 to S15 described above.

In this manner, the production system 10 transfers the component P to the transfer conveyor 32, and produces (manufactures) products such as motor control apparatuses.

The present invention is not limited to the above described embodiment. For example, a configuration constituted by incorporating a part or all of the above described embodiment and the modified examples can also be included in the technical scope of the present invention.

A layout of the item feeding device, the transfer conveyor, and the carrier device of the production system is not limited to the above embodiment.

The robot is not limited to the vertical articulated robot, and may be any carrier device as long as the device can carry the components and the containers.

The item feeding device is only required to supply arbitrary items. Further, the number of the transfer mechanisms of the item feeding device is not limited to four.

The container is not limited to a container storing the components, and may be any container that can store arbitrary items. Further, the components are not necessarily placed on the spacers.

What is claimed is:

1. A production system, comprising:
    an item feeding device having a plurality of transfer mechanisms provided alongside, the transfer mechanisms respectively transferring containers each storing an item to item feeding positions;
    a carrier device configured to hold and carry the container at the item feeding position and the item stored in the container; and
    a control device configured to control operations of the item feeding device and the carrier device, wherein the control device includes
        a portion making the item feeding device operate to select only one of the plurality of transfer mechanisms and to transfer the container of the selected transfer mechanism to the item feeding position;
        a portion making the carrier device operate to hold the item in the container transferred to the item feeding position and to carry the held item to a preliminary determined transfer position P1; and
        a portion making the carrier device operate to hold the container transferred to the item feeding position, and to carry the container from the item feeding position of a first transfer mechanism to a preliminary determined transfer position P2 along a path that extends over an item feeding position for a different one of the transfer mechanisms.

2. The production system according to claim 1, wherein, when carried along the path, the carrier device is operated to carry the container such that a lower end of the container moves at a height lower than an upper end of the other containers on the item feeding device.

3. The production system according to claim 2, wherein, when carried along the path, the carrier device is operated to carry the container such that the lower end of the container moves at a height lower than the transfer position P1.

4. The production system according to claim 2, wherein the transfer position P2 is higher than a transfer height of the transfer mechanisms and lower than the transfer position P1.

5. The production system according to claim 4, further comprising:
    a transfer conveyor configured to transfer the item in a direction intersecting with a transfer direction of the transfer mechanisms,
    wherein the transfer position P1 is set to be on a transfer height of the transfer conveyor.

6. The production system according to claim 4, wherein, when carried along the path, the carrier device is operated to carry the container such that the lower end of the container moves at a height lower than the transfer position P1.

7. The production system according to claim 2, further comprising:
    a transfer conveyor configured to transfer the item in a direction intersecting with a transfer direction of the transfer mechanisms,
    wherein the transfer position P1 is set to be on a transfer height of the transfer conveyor.

8. The production system according to claim 7, wherein, when carried along the path, the carrier device is operated to carry the container such that the lower end of the container moves at a height lower than the transfer position P1.

9. The production system according to claim 7, wherein the carrier device has:
   a first gripping claw configured to hold the container; and
   a second gripping claw disposed within the first gripping claw and configured to hold the item.

10. The production system according to claim 9, wherein the carrier device further has:
    a first fluid cylinder configured to drive the first gripping claw;
    a second fluid cylinder configured to drive the second gripping claw; and
    a first and a second solenoid valve configured to respectively control operations of the first and the second fluid cylinders, wherein the first and the second fluid cylinders are operated by a fluid supplied from a common fluid supply source.

11. The production system according to claim 10, wherein the item is one of components each placed on a plate-like spacer, and
    the components are stacked on top of each other in a vertical direction with the spacer interposed therebetween and stored in the container.

12. The production system according to claim 9, wherein the item is one of components each placed on a plate-like spacer, and
    the components are stacked on top of each other in a vertical direction with the spacer interposed therebetween and stored in the container.

13. The production system according to claim 12, wherein the item feeding device further has a lifting mechanism disposed on a downstream side of the item feeding position in the transfer direction and configured to move one of the components up to a preliminary determined height by lifting the spacer disposed at a lowermost position of the container having been supplied at the item feeding position.

14. The production system according to claim 13, wherein the lifting mechanism has a supporting member configured to move upward so as to support a lower surface of the spacer at the lowermost position of the container, and
    the container has a base member including a cut-out having the supporting member passing therethrough, and a plurality of positioning members extending upward from an upper surface of the base member and configured to position the spacer within a preliminary determined range.

15. The production system according to claim 12, wherein the item feeding device further has a lifting mechanism configured to move one of the components up to a preliminary determined height.

16. The production system according to claim 15, wherein the lifting mechanism has a supporting member configured to move upward so as to support a lower surface of the spacer at a lowermost position of the container, and
    the container has a base member including a cut-out having the supporting member passing therethrough, and a plurality of positioning members extending upward from an upper surface of the base member and configured to position the spacer within a preliminary determined range.

17. The production system according to claim 12, wherein the control device further has a function of causing the carrier device to, after carrying one of the components, carry the spacer having the transferred component placed thereon to a preliminary determined transfer position P3.

18. The production system according to claim 17, wherein the control device further has a function of causing the carrier device to transfer the container to the transfer position P2, the container having a lowermost one of the spacers left therein.

19. A processed object manufacturing method using items having been supplied, utilizing the production system according to claim 1, said method comprising:
    selecting only one of a plurality of transfer mechanisms provided alongside and transferring a container of the selected transfer mechanism to an item feeding position;
    holding an item stored in the container transferred to the item feeding position using a carrier device and carrying the held item to a preliminary determined transfer position P1; and
    holding the container transferred to the item feeding position using the carrier device and carrying the container from the item feeding position to a preliminary determined transfer position P2 over an item feeding position for a different one of the transfer mechanisms.

20. A container transferring method, utilizing the production system according to claim 1, said method comprising:
    transferring a plurality of containers each storing an item to a corresponding waiting position in a first direction;
    transferring only one of the plurality of containers having been transferred to the waiting positions to an item feeding position on a downstream side of the waiting position in a transfer direction; and
    moving the container upward after taking out the item stored in the container at the item feeding position and transferring the taken out item in a second direction intersecting with the first direction.

* * * * *